United States Patent
Lavie (12)

(10) Patent No.: US 8,021,554 B2
(45) Date of Patent: Sep. 20, 2011

(54) METHOD AND APPARATUS FOR LIQUID-LIQUID EXTRACTION

(75) Inventor: Ram Lavie, Haifa (IL)

(73) Assignee: T.L.X. Extraction Technologies Ltd., Haifa (IL)

( * ) Notice: Subject to any disclaimer, the term of this patent is extended or adjusted under 35 U.S.C. 154(b) by 386 days.

(21) Appl. No.: 12/301,846

(22) PCT Filed: Jun. 12, 2007

(86) PCT No.: PCT/IL2007/000707
§ 371 (c)(1),
(2), (4) Date: Nov. 21, 2008

(87) PCT Pub. No.: WO2007/144877
PCT Pub. Date: Dec. 21, 2007

(65) Prior Publication Data
US 2010/0288702 A1    Nov. 18, 2010

(30) Foreign Application Priority Data

Jun. 14, 2006 (IL) .......................... 176291
Jan. 21, 2007 (IL) .......................... 180831

(51) Int. Cl.
*B01D 11/04* (2006.01)
*B01D 61/32* (2006.01)
*B01D 63/00* (2006.01)

(52) U.S. Cl. ............... 210/644; 210/209; 210/321.72

(58) Field of Classification Search ........... 210/604, 210/209, 321.72, 644
See application file for complete search history.

(56) References Cited

U.S. PATENT DOCUMENTS

| 3,914,175 | A | 10/1975 | Kunz et al. |
| 4,154,674 | A | 5/1979 | Warshawsky et al. |
| 4,200,525 | A | 4/1980 | Karr |
| 4,268,484 | A | 5/1981 | Gavin |
| 4,292,277 | A | 9/1981 | Bonney et al. |
| 4,545,901 | A | 10/1985 | Schneider |
| 4,609,457 | A | 9/1986 | Kilroy |
| 4,789,468 | A | 12/1988 | Sirkar |
| 4,851,124 | A | 7/1989 | Vandegrift et al. |
| 4,997,569 | A | 3/1991 | Sirkar |
| 5,045,209 | A | 9/1991 | Snyder et al. |
| 5,149,436 | A | 9/1992 | Taniguchi et al. |
| 5,198,120 | A | 3/1993 | Masuda et al. |
| 5,578,217 | A | 11/1996 | Unger et al. |
| 2004/0178147 | A1 | 9/2004 | Fanselow et al. |

FOREIGN PATENT DOCUMENTS

| DE | 19613280 A1 | 10/1997 |
| WO | WO 99/29388 A1 | 6/1999 |

OTHER PUBLICATIONS

International Search Report for International Application No. PCT/IL2007/000707, mailed May 22, 2008.
Dolev et al. in "Intensive Periodic Liquid-liquid Extraction in a Thin Extractant Layer", Ind. Eng. Chem. Res. 1999, 38 1618-1624.

(Continued)

*Primary Examiner* — David A Reifsnyder
(74) *Attorney, Agent, or Firm* — Pearl Cohen Zedek Latzer, LLP (57) ABSTRACT

A Liquid-Liquid Extraction apparatus for extracting at least one species from a donor liquid solution (6) into at least one recipient liquid (8) is disclosed The apparatus comprises one or more cells comprising a cartridge (3) with an open macro-porous solid matrix made o a micro-porous material having affinity to an extractant material, so that a thin layer of liquid extractant may attach to the matrix.

15 Claims, 6 Drawing Sheets

OTHER PUBLICATIONS

Serengupta et al. in "Separation of Solutes from Aqueous Solutions by Contained Liquid Membranes", AIChE Jurnal, 1988, vol. 34 No. 10., p. 1698-1708.

Serengupta et al. in "Separation of Liquid Solutions by Contained Liquid Membranes", Department of Chemistry and Chemicals Engineering, Stevens Institute of Technology, 1988, p. 1735-1751.
Supplementary European Search Report issued on Aug. 17, 2010 for European Patent Application No. 07736447.

METHOD AND APPARATUS FOR LIQUID-LIQUID EXTRACTION

CROSS-REFERENCE TO RELATED APPLICATIONS

This application is a national phase application of PCT International Application No. PCT/IL2007/000707, international filing date Jun. 12, 2007, published on Dec. 21, 2007 as International Publication Number WO 2007/144877, which claims priority of IL patent application Ser. No. 176291 filed Jun. 14, 2006 and IL patent application Ser. No. 180831 filed Jan. 21, 2007.

FIELD OF THE INVENTION

The present invention relates to Liquid-Liquid Extraction, a procedure for the separation of dissolved species in solutions, whereby one or more specific dissolved species are selectively transferred from a donor solution into an immiscible active compound or mixture, termed the extractant and further on from the extractant to a second recipient solution. More particularly, the invention relates to an improved method for carrying out the extraction.

BACKGROUND OF THE INVENTION

Liquid-Liquid Extraction is an important procedure for the recovery of valuable species or for the purification of streams. It plays a central role in numerous processes in the chemical, hydrometallurgical, biotechnological and pharmaceutical industries. When applicable, it is preferred over other separation procedures because it uses relatively little energy and does not expose the processed materials to extreme temperatures. Conventional Liquid-Liquid Extraction, as performed today, consists of a four step procedure: Firstly, the donor liquid solution is brought in close contact with a selected immiscible extractant having a density that is different from that of both the donor and the recipient solutions, at conditions (compositions or temperatures or pH) that promote the transfer of the species from the donor solution to the extractant. This is achieved by creating a mixture of droplets of the extractant in the solution or of droplets of the solution in the extractant. Secondly, after having provided sufficient time for the transfer to take place, the extractant phase is separated from the solution phase by gravitation and/or centrifugation. Thirdly, the now loaded extractant is brought in close contact with the recipient solution at new conditions (compositions or temperatures or pH) that are conducive to the transfer of the species from the extractant to the recipient solution, by again creating a mixture of droplets of the extractant in the solution or of droplets of the solution in the extractant. Finally, after having provided sufficient time for the transfer to take place, the extractant phase is separated from the solution phase by gravitation and/or centrifugation. Then, the extractant having been freed of the extracted species is mostly recycled, directly or following purification, for reuse in the first step. The first two steps are named the extraction stage and the second pair of steps is named the back-extraction stage. Thus, each extraction (or back-extraction) stage consists of a mixing+ phase separation set to which two feed streams are fed, one a heavier phase, typically aqueous and the other a lighter phase, typically an oil and generating two streams, again one aqueous and one oily. It sometimes happens that the extractant used, in addition to its affinity to the species of interest in the donor solution also has affinity to additional species present therein. When interested to obtain the extracted species in distinct recipient solutions, one or more additional back-extraction stages may be added to the cycle that will then consist of an extraction stage followed by more than one back-extraction stages. Since the case involving several distinct separated species, while adding to the complexity of the process, does not affect the principle of the operation, our discussion will center for simplicity, on a cycle comprising a single extraction followed by a single back-extraction stage. As the amount of species transferred in a single extraction or back-extraction stage is usually limited, stages of extraction and stages of back-extraction are mostly organized in series to form a train of extraction stages and trains of back-extraction stages in each of which the solution flows in a counter-current or a co-current direction to the extractant. Thus, a larger amount of the species can be transferred from the donor solution to the extractant and then from the extractant to the recipient solution thereby enriching the recipient solution in the transferred species producing an enriched recipient solution while impoverishing the donor solution in the transferred species producing a raffinate solution. The physical implementation of a train of extraction or back-extraction stages takes mostly the form of a battery of Mixer-Settlers or of one of several types of Column Extractors. The Liquid-Liquid Extraction procedure is sometimes included within a broader process to perform a separation task as a part of a wider scheme (e.g. a reaction). When the process utilizing Liquid-Liquid Extraction is designed for the sole purpose of component separation, it is called an extraction process. A typical extraction process may include, in addition to one or more extraction trains, other processing units to effect washing, stripping, distillation, etc. in a network of streams. The product of interest in an extraction process may either be the raffinate solution, or the enriched recipient solution, or both.

The design of an extraction plant is a complex task. Given a separation objective, a suitable extractant must first be identified and then a processing path can be delineated. Given the non-negligible cost of most extractants, a Liquid-Liquid Extraction plant will seek to recycle the extractant in a closed cycle. When the extractant regeneration is all done in situ, the plant is characterized as a closed-extractant-cycle plant. Mutual immiscibility of the phases is a basic requirement in all Liquid-Liquid Extraction processes. The majority of applications use an oily extractant to process aqueous solutions but the other way around is just as valid.

Numerous attempts have been made to improve the performance of the equipment used to implement Liquid-Liquid Extraction where two liquid streams, one aqueous and the other oil, are brought into contact in Mixer-Settlers or Extraction Columns. To mention just a few examples, in U.S. Pat. No. 3,914,175 Kunz proposes a modification of the settler to facilitate the separation of the phases, in U.S. Pat. No. 4,268,484 Gavin addresses the arrangement of the mixing and settling chambers in a Mixer-Settler plant, in U.S. Pat. No. 4,292,277 Bonney et al. suggest a rearrangement of the flows within a Mixer-Settler plant, in U.S. Pat. No. 4,545,901 Schneider addresses the energy invested in agitation, in U.S. Pat. No. 4,200,525 Karr suggests the contacting of the phases in a reciprocating plate Extraction Column on the basis of a specific equation, in U.S. Pat. No. 4,609,457 Kilroy suggests an operation and control method for the Extraction Column. A common feature of all those patents is that they all persist in the paradigm stating that Liquid-Liquid Extraction is carried out by mixing intimately two streams, one aqueous and the other oily and then rely on a density difference to separate them. Also, following this paradigm, when it is needed to transfer a solute from one aqueous solution to another, the extraction must be applied twice in two distinct apparatus, in the first the solute is transferred from one aqueous solution to the oily phase and then in the second it is transferred from the oily phase to the other aqueous solution.

The first attempt to break away from this paradigm was the introduction of the Supported Liquid Membrane (SLM) concept where a solute is transferred directly from one aqueous solution to another by permeating through a supported liquid membrane. In U.S. Pat. No. 4,851,124 Vandegrift, et al. propose the immobilization of the oily component on a membrane thereby forming a supported liquid membrane that will then separate two aqueous solutions, causing a solute to permeate through the membrane from one aqueous solution to the other. Thereafter, the application of Supported Liquid Membranes for liquid extraction reappears as the subject of numerous additional US patent references. Still, with all this activity around SLMs, actual practical application of the SLM method to perform industrial separations in bulk is scarce, mainly because of the difficulty in maintaining, stably and over a significant time span, a whole and continuous liquid membrane that is thin enough to provide a meaningful mass transfer rate. In view of this difficulty with the SLM approach, an alternative approach, making use of membrane permeation, but splitting the extraction and back-extraction into two distinct steps, was developed. In U.S. Pat. Nos. 4,789,468 and 4,997,569 Sirkar describes an Immobilized-Interface Solute-Transfer apparatus where two streams, one an extractant and the other a solution pass through two adjacent compartments separated by a membrane. A solute permeates from the solution through the membrane to the extractant or the other way around. Stability of the operation is facilitated by controlling the differential pressure across the membrane. Alternatively, Sirkar suggests a three-compartment option, combining the functions of two two-compartment units into an extraction/back-extraction scheme. The extractant in a central compartment is separated from two solutions flowing in two additional compartments by two membranes. This causes a solute in the feed solution stream to permeate through a first membrane into the extractant and then migrate from the extractant through the second membrane to the second solution stream. Here again stability of the operation is facilitated by controlling the differential pressure across each of the two membranes. Sirkar's method prefers the membrane to be in the form of a hollow fiber membrane, which has led it to be named in consequent publications, Hollow-Fiber Contained Liquid Membrane, in short HFCLM. The three-compartment HFCLM can be viewed as an extended SLM where the single SLM membrane has been replaced by a double membrane enclosing a body of extractant, imparting it with added stability at the expense of an increased resistance to mass transfer. Mass transfer is indeed a major consideration in all membrane assisted liquid extraction and it has consequently become a focus of interest in the published literature. With the ultimate goal of creating a closed extractant cycle extraction/back-extraction process, two separate two-compartment units, one for extraction and the other for back-extraction is evidently more flexible than using a single three-compartment unit. Like the SLM method before it, the HFCLM approach circumvents the problems caused by phase dispersion and then separation plaguing conventional Liquid-Liquid Extraction. However, two major problems afflict all membrane based extraction processes: The first relates to the stability of membrane, namely the prevention of one phase to leak through the membrane to another phase, thereby degrading its function. Sirkar addresses this problem by controlling the differential pressure across the membrane. The second problem concerns the rate of mass transfer which is hindered by a series of resistances, three resistances in SLM and six to seven resistances in series for HFCLM, the sum of which naturally results in a significant overall resistance to mass transfer with consequent limited throughput. The concept of Liquid-Liquid Extraction in a thin extractant layer was first mentioned in a paper (Dolev, Kehat and Lavie, Ind. Eng. Chem. Res. 1999, 38, 1618-1624). It advanced the hypothesis that a bed of extractant-coated pellets could be used to form the equivalent of an adsorbent bed in a temperature swing process, causing a feed solution of constant composition and periodic temperature to yield a stream varying in composition and temperature over time. The results, while indicating some extraction effect, lacked practical significance because it failed to recognize the central role played by the extractant to solution ratio or the relative thickness of the phases brought into contact, it did not offer a practical implementation relevant to the way a Liquid-Liquid Extraction cycle operates, and offered no solution to the instability of the thin extractant layer, which caused the extraction effect to deteriorate within a limited number of cycles. Numerous studies concerning the use of micro-porous membranes to perform various fluid separation tasks have recently been published. Gas-gas separations and gas-liquid separations have been successful to the point of establishing numerous industrial applications. Liquid-Liquid Extraction through micro-porous membranes has not been as fortunate so far. Nevertheless, considerable understanding of the problems afflicting membrane separation of liquids has accumulated. For example, Serengupta et al. (AIChE J. 1988, 34 p. 1698 and Sep. Sci. Technol. 1988, 23, p. 1735) have found that using a pure extractant, rather than a modified and diluted one, considerably improves membrane stability. Numerous studies address the resistances to mass transfer in HFCLM, tabulating values for the individual resistances pertaining to various fluids.

BRIEF DESCRIPTION OF THE INVENTION

There is thus provided, in accordance with some preferred embodiments of the present invention, a Liquid-Liquid Extraction apparatus for extracting at least one species from a donor liquid solution into at least one recipient liquid solution, the apparatus comprising at least one cell comprising a cartridge comprising an open macro-porous solid matrix made of a micro-porous material having affinity to an extractant material, so that a thin layer of liquid extractant may attach to the matrix.

Furthermore, in accordance with some preferred embodiments of the present invention, the micro-porous material is hydrophobic so as to attach to an oily extractant.

Furthermore, in accordance with some preferred embodiments of the present invention, the micro-porous material is hydrophilic so as to attach to an aqueous extractant.

Furthermore, in accordance with some preferred embodiments of the present invention, the cell is housed in a container.

Furthermore, in accordance with some preferred embodiments of the present invention, the container has at least one port for introducing the solutions into the cell and a vent located at a top location of the container.

Furthermore, in accordance with some preferred embodiments of the present invention, the port is located at a bottom of the apparatus so as to serve also for draining the apparatus as well.

Furthermore, in accordance with some preferred embodiments of the present invention, the container has at least four ports, a first port for introducing the donor feed solution and a second or more ports for introducing the recipient feed solution, a port for removing the raffinate solution and one or more ports for removing the enriched recipient solutions.

Furthermore, in accordance with some preferred embodiments of the present invention, the container is fluidically connected to a donor feed container for containing the donor feed solution, a raffinate container for containing the raffinate and to at least one recipient feed container for containing said at least one recipient feed solution and to at least one enriched recipient container for containing said at least one enriched recipient solution.

Furthermore, in accordance with some preferred embodiments of the present invention, the apparatus is provided with pumps and valves and a controller for controlling the valves to facilitate inflow and outflow of the solutions through said at least one cell.

Furthermore, in accordance with some preferred embodiments of the present invention, the cartridge is rotatable.

Furthermore, in accordance with some preferred embodiments of the present invention, the matrix comprises one or more capillaries, and wherein the container shells said one or more tubes.

Furthermore, in accordance with some preferred embodiments of the present invention, one or more capillaries comprise a bundle of capillaries.

Furthermore, in accordance with some preferred embodiments of the present invention, the apparatus comprises a plurality of cells fluidically connected in series.

Furthermore, in accordance with some preferred embodiments of the present invention, the plurality of cells are stacked in the form of a column.

Furthermore, in accordance with some preferred embodiments of the present invention, the apparatus is provided with at least one pump for facilitating feeding the solutions and for the transfer of solutions from cell to cell.

Furthermore, in accordance with some preferred embodiments of the present invention, a reservoir of liquid extractant is provided for continuously replenishing the thin layer of liquid extractant.

Furthermore, in accordance with some preferred embodiments of the present invention, there is provided a Liquid-Liquid Extraction method for extracting at least one species from a donor liquid solution into at least one recipient liquid solution, the method comprising:
bringing the donor liquid solution in contact with a thin layer of a liquid extractant that is supported on a solid substrate so as to transfer said at least one species from the donor liquid solution onto the thin layer of extractant;
subsequently bringing in contact said at least one recipient liquid solution with the thin layer of liquid extractant so as to transfer said at least one species from the thin layer of liquid extractant into said at least one recipient liquid solution;
repeatedly performing the above steps, facilitating alternating contact between the thin layer of a liquid extractant, and the donor liquid solution or said at least one recipient liquid solution.

Furthermore, in accordance with some preferred embodiments of the present invention, said at least one recipient liquid solution comprises more than one recipient liquid solution.

Furthermore, in accordance with some preferred embodiments of the present invention, the donor and recipient solutions are aqueous and the extractant comprises an oil.

Furthermore, in accordance with some preferred embodiments of the present invention, the donor and recipient solutions comprise one or more oils and the extractant is immiscible with said one or more oils.

Furthermore, in accordance with some preferred embodiments of the present invention, the thin layer of a liquid extractant is provided on a macro-porous solid matrix made of a micro-porous material having affinity to an extractant material.

Furthermore, in accordance with some preferred embodiments of the present invention, the thin layer of liquid extractant is continuously replenished from a provided reservoir of liquid extractant.

DETAILED DESCRIPTION OF PREFERRED EMBODIMENTS

Our invention relates to a method for carrying out the Liquid-Liquid Extraction process.

More particularly, the invention relates to an improved method to carry out a Liquid-Liquid Extraction process that considerably simplifies the phase separation steps while also using substantially smaller amounts of extractant. The extractants used in extraction being mostly expensive, volatile, flammable and sometimes toxic, we thus impact favorably on costs and extractant inventories with consequential improved safety and environmental impact.

Moreover, the high cost of pure extractants combined with the small amount of extractant used in our method make it economical to apply a potent pure extractant to the task, while also avoiding the need to mix it with diluents and modifiers such as are necessary in conventional extraction to facilitate drop formation or coalescence or to reduce costs. Our method circumvents a limitation afflicting the industry, namely the conflicting demands imposed by mass transfer (small dispersed-phase drops improve mass transfer) on the one hand, and by phase separation (large dispersed-phase drops facilitate phase separation), on the other hand. Also, our invention removes the density of the extractant from being a consideration in the selection of an extractant and mitigates considerations of viscosity, interfacial tension and a tendency to create a third phase with the extractant that often plague conventional liquid-liquid extraction. Finally, the method offers a potential advantage in multi-product plants, facilitating the use of the same equipment for different products by the equipment consisting of separable parts, an easily cleanable container, a replaceable cartridge and a separate drive.

Externally, our invention is a closed-extractant-cycle extraction process where, rather than pumping around the extractant in bulk through trains of extraction and back-extraction, a small amount of the extractant is permanently attached, or occluded, as a thin layer, to a solid support that alternately contacts the donor and recipient solutions at the appropriate conditions without ever separating from its solid support. Differently from current extraction processes where the extractant is circulated first through an extraction train of successive extraction stages, then through a back-extraction train of successive back-extraction stages, in our invention the extractant alternates in contacting the donor solution and the recipient solution in individual extraction/back-extraction cells. The cell is a volume or section of equipment within which a complete cycle of extraction and then back extraction takes place. Each cell is associated with a cartridge supporting a small amount of the extractant. Each cell is fed with a donor feed solution and at least one recipient feed solution, generating a raffinate solution and at least one enriched recipient solution. In one simple form, each cell consists of two or more regions, each containing one of the solutions. The cartridge, or parts of it, alternates at being intimately exposed to each of the solutions in sequence. When exposed to the donor solution, the extractant on the cartridge picks up some of the transferred species contained therein, and then the cartridge is exposed to the recipient solution where the extractant releases the transferred species into the recipient solution. In another alternative simple form, the same identical result is obtained by the cartridge standing still in a container while the donor and recipient solutions repeatedly alternate at being brought into and out of that container where they contact the cartridge. In both forms, the depth of penetration of the transferred species into the extractant thin layer can be controlled by adjusting the contact time while the thickness of the solution layer being contacted with the extractant layer is controlled by the constitution of the cartridge or by spraying the solution as a thin layer over the cartridge.

Summarizing, we propose a Liquid-Liquid Extraction method for extracting at least one species from a donor liquid solution into at least one recipient liquid solution, the method comprising: bringing the donor liquid solution in contact with a thin layer of a liquid extractant that is supported on a solid substrate so as to transfer said at least one species from the donor liquid solution onto the thin layer of extractant subsequently bringing in contact said at least one recipient liquid solution with the thin layer of liquid extractant so as to transfer said at least one species from the thin layer of liquid extractant into said at least one recipient liquid solution; repeatedly performing the above steps, facilitating alternating contact between the thin layer of a liquid extractant, and the donor liquid solution or said at least one recipient liquid solution.

The rationale of our invention follows the following arguments: The extraction process involves the diffusion of a species from the bulk of the donor solution to its interface with the extractant, then its diffusion into the interior of the extractant body. In back-extraction the species must first diffuse from the interior of the extractant body to its interface with the recipient solution and from there it must diffuse into the bulk of the recipient solution.

Those diffusion aspects are critical in Liquid-Liquid Extraction. In conventional extraction technology the rate of diffusion is influenced by the size of the droplets of the dispersed phase, which in turn impacts on both mass transfer rate and on phase separation difficulty, while the continuous phase is of necessity enveloping the droplets in a relatively thick layer.

Two major aspects of diffusion are addressed by our invention:

a) The time of diffusion of the species out of and into the solution and into and out of the extractant, and
b) The length (and consequent time) of the path followed by the extractant and the solutions within the extraction/back-extraction cell.

The diffusion of a species penetrating (or exiting) a body of liquid follows Fick's Law:

$$\frac{\partial c}{\partial t} = D\frac{\partial^2 c}{\partial z^2}$$

Where t is the time, z is the distance traveled by the species, c is its concentration and D is the diffusivity of the species in the liquid. This equation prescribes a profile of concentrations in time and space in the liquid indicating that the rate of penetration of a species into or out of the very external layer of a body of liquid is relatively fast, slowing down exponentially as it proceeds into deeper layers. On the other hand, the capacity of a layer of liquid to contain the transferred species is linearly proportional to its thickness. It follows that, from the point of view of mass transfer, exploiting an exponential gain in rate, while sacrificing only linearly in either of the liquids capacity indicates an advantage of bringing into contact thin layers of extractant and of solution. This indeed partly transpires in current extraction technology, where the advantage of small droplets in what concerns mass transfer, is well known, but there it is offset there by a difficulty in phase separation. Also, in conventional liquid-liquid extraction, the droplets are of necessity surrounded by a relatively thick layer of the continuous phase. We seek to exploit our mass transfer advantage by maintaining a thin layer of extractant permanently attached to a solid support that can be brought into contact with preferably thin layers of the solutions, mechanically, at will. Unlike current extraction technology where the desired extraction is achieved by a relatively large amount of the extractant easing its way through the steps and stages of the process, we provide a more efficient turnover by rapidly recycling the small amount of extractant contained in the thin layer in cycles of extraction/back-extraction, one stage at a time. The rapid turnover is afforded because of the reduced resistance to mass transfer. Our process configuration sums up to having a small amount of extractant processing at each instance a small amount of solution while providing an overall capacity comparable to that attained in conventional extraction plants using a much larger amount of extractant. The number of stages necessary to reach an overall desired degree of extraction is roughly inversely proportional to the extent of extraction in each individual stage. Also, a simple mass balance over an extraction/back-extraction cycle in a thin layer extraction cell indicates that the extent of extraction reached at each contact between the phases in the cell depends on their relative amounts: A small extractant/solution ratio will provide a small extent of extraction. Up to a limit, a larger extractant/solution ratio is beneficial. In our method, a necessary minimum ratio of 0.005 gr extractant/gr solution is ensured by limiting the amount of solution contacted with extractant at each instance by either spraying a controlled fine mist of the solution into the macro-porous cavities of the cartridge, or by designing the cartridge such as to maintain an acceptable volume ratio between the micro-porous cavities to the macro-porous cavities, which will then permit the cartridge to be entirely engulfed in the solution. Evidently, a thin layer of extractant and a relatively high extractant to solution ratio automatically imply that the contacted solution layer is also thin. Our new paradigm is therefore: Shallow, frequent and repeated penetration of the solutes into and out of the extractant and solution layers. Irrespective of the absolute amount of extractant used, the solutions and extractant are brought at every contact instance close to the same respective equilibrium.

The thickness of the layers is a critical design parameter since it determines the maximum possible penetration depth of the transferred species at each extraction contact. Up to this limit, the depth of penetration of the transferred species into the extractant at each extraction contact depends on the allowed contact time, which in turn reflects on the average cycle period. Due to time overhead, the frequency yielding the best results may have to be fine-tuned for optimal results in every specific application.

The cartridge is at the heart of every embodiment of the invention. It is required to be porous on two different scales: It consists of a macro-porous, solid matrix with internal cavities that are interconnected and open to the exterior and are separated by walls made of a micro-porous material having an affinity to the extractant. The cartridge will have open channels (macro-pores), wide enough to permit free flow of the solutions into and out of the channels and, when the cartridge is intended to be entirely engulfed in the solution, the channels must also be small enough to limit the amount of solution that is brought into contact with the limited amount of extractant at each contact instance and to limit the distance to be traveled by the species in the solution to or from the extractant layer. The micro-porous material making up the walls of the solid matrix is impregnated with the extractant which adheres strongly to the micro-porous material by capillary or by chemical forces, thus forming a continuous permanent thin layer of extractant of thickness that may be related to that of the micro-porous material. The impregnated cartridge thus behaves effectively as if made of extractant.

Evidently, the micro-porous material will preferably be hydrophobic when using an oily extractant and hydrophilic when using an aqueous extractant. The surface of the extractant layer is exposed on one or both its faces to contact with the liquid solutions whenever the solution penetrates the cartridge macro-pores. The cartridge may be formed in various physical forms. It may be formed for example as a monolithic unit, or by bundling thin-walled micro-porous capillaries, or by creating a brush whose bristles are made of the suitable micro-porous material, or by stretching a long strip of flat micro-porous material back and forth on a suitable frame. Evidently, the cartridge is light in weight and requires little force for manipulation. The low heat capacity of the cartridge makes it a natural choice for application in extractions that are driven by temperature.

When the entire closed-extractant-cycle extraction process of interest must include more than two steps, say for example extraction, back-extraction and washing, or when back-extracting more than one extracted species separately, then each cell may consist of the respective consecutive steps whereby the extractant-impregnated solid support is consecutively contacted with the respective solutions in each cycle of operation.

Cells may be connected in series to form a train of cells through which the donor and the recipient solutions flow from one cell to the next in a counter-current or co-current or cross-current direction while within each cell, the extractant is brought into contact with the solutions in a cross-current direction. Each cell in our invention performs both extraction and back-extraction. Comparing the solutions flow network in our invention to that in a conventional extraction process, we observe that according to our method the entire extraction plant consists of a single train of cells accepting and rejecting the participating solutions at its perimeter with no externally visible flow of extractant, as compared to the conventional plant that consists of two or more trains of stages though each of which the extractant and one of the solutions are circulated. It is of interest to note that since each of our cells performs both the tasks of extraction and of back-extraction, our configuration uses half or less as many cells as there are stages in a conventional multistage extraction/back-extraction plant in order to achieve a same prescribed extent of separation. Moreover, it can be shown that, for a complete extraction/back-extraction cycle, our mode of operation is also more efficient, in terms of the theoretical number of steps necessary to provide a same overall performance. This can be attributed to a higher driving force prevailing in each stage.

In one preferred embodiment, the extractant-impregnated porous cartridge alternates at being dipped into two or more pans, one containing the donor solution and the others containing the recipient solutions. In a second embodiment, the cartridge is packed into a fixed container, while the donor and the recipient solutions repeatedly alternate in charging and then discharging the container each one at its turn. In another embodiment, the fixed container is constantly full with a combination of both the donor and the recipient solutions in two distinct bodies of liquid that repeatedly move back and forth as a plug, replacing each other in the cartridge macro-pores, thereby alternating in contacting the supported extractant. In still another preferred embodiment, each cell consists of a cylindrical cartridge that is rotated through two or more compartments, with each compartment equipped with arrangements for the flowing of the respective streams of the donor and of the recipient solutions.

Embodiment (a)

Figure 1:
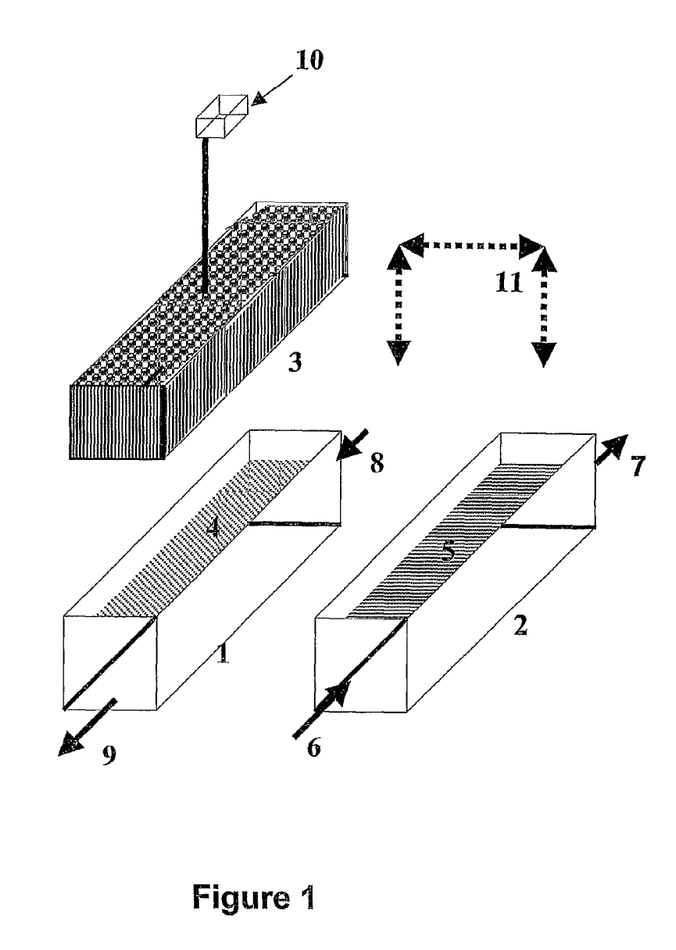
FIG. 1: Embodiment (a)—Open top pans cell.

Open Top Pans Cell (see FIG. 1)

In a first embodiment, our extraction plant will consist of: (a) two or more identical, open top, elongated horizontal pans, depicted in FIG. 1 as one extraction pan and a single back-extraction pan. Pan 1 contains the donor solution 4 and pan 2 contains the recipient solution 5. For counter-current operation, the donor feed solution 6 and the recipient feed solution 8, are fed to opposing ends of their respective pan 1 and 2. The raffinate 7 and the enriched recipient solution 9 are withdrawn from their respective pans 1 and 2 at opposing ends. (b) A cartridge 3 sized to fit the internal volume of the pans 1 and 2. The cartridge is permanently impregnated with a layer of the extractant. (c) A robotic overhead arm 10. The robot arm is programmed to alternate in directing the cartridge into each of the two pans and fully engulf it into the respective solution following a motion as delineated in 11. This robot arm motion will cause the cartridge 3 to be engulfed in the donor solution 4 contained in pan 1, for a programmed time, typically a few seconds, then lift the cartridge 3 to a position on top of the same pan, then shake the cartridge vertically for a programmed time, typically a few seconds, in order to shake off any clinging solution, then proceed to repeat exactly the same path into the recipient solution 5 that is contained in pan 2. Then back to solution 4 etc. The motion is repeated as a periodic cycle.

For a closed extraction cycle involving more than one back extraction step (for example if a washing step needs to be incorporated in the extraction cycle), additional pans and solutions will be added in parallel to the two detailed in FIG. 1 and the robot arm will be programmed to engulf the cartridge in a repeated sequence into each of the solutions contained in the pans at its turn.

Embodiment (b)

One-sided Fixed Cartridge Cell. (See FIG. 2)

Figure 2:
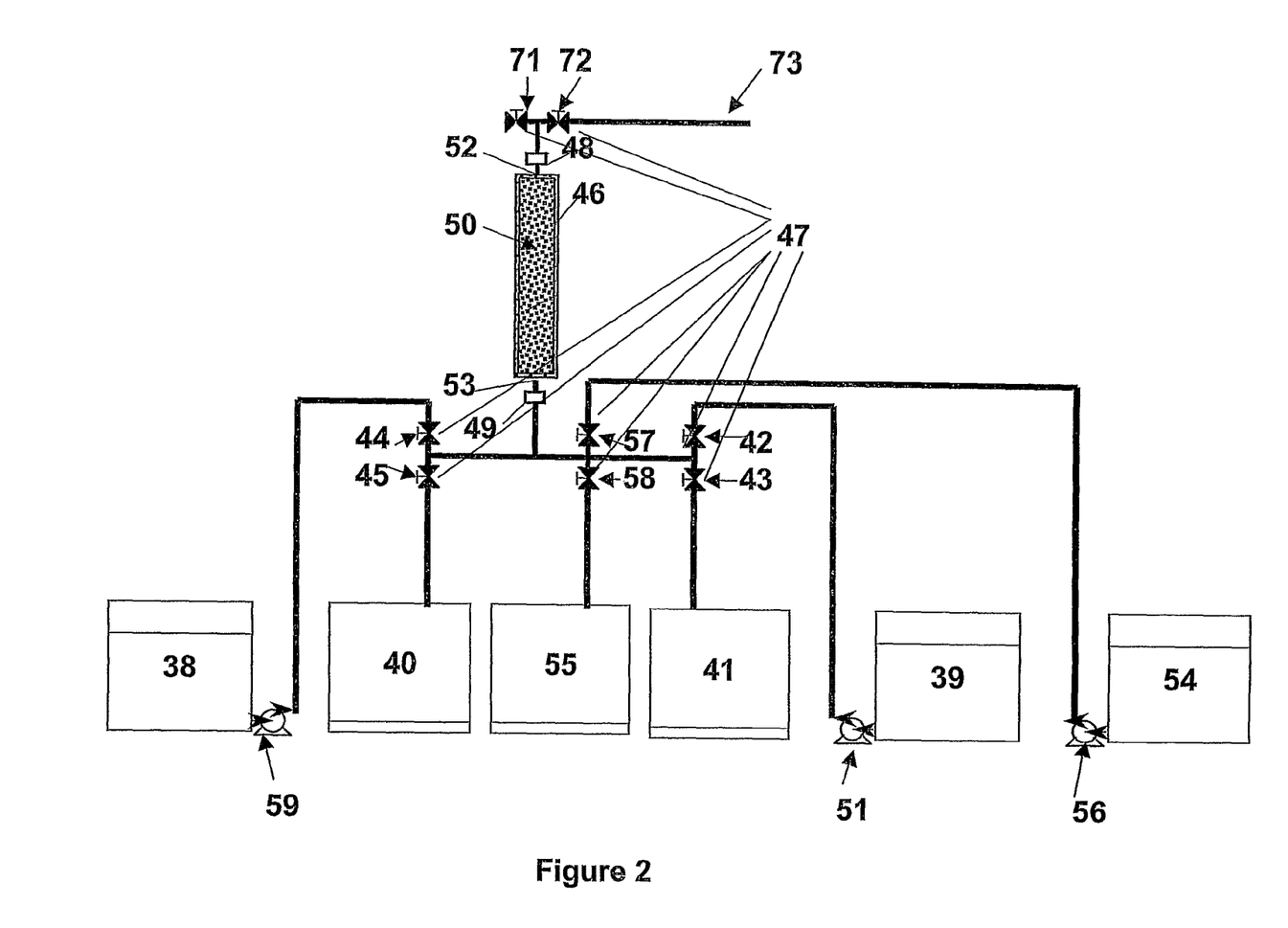
FIG. 2: Embodiments (b)—One sided fixed cartridge and (c)—Shell-and-tube Fixed Cartridge cell

In another embodiment, the cell is depicted in FIG. 2 for one extraction and two back-extraction steps in its entirety. It consists of the cartridge 50 packed into a cartridge container 46 having one port 52 at its top and having one or more ports that may be integrated as shown in this figure into one port 53 at its bottom. The cartridge container 46 may be installed in a vertical position or inclined, so long as the upper port 52 is located at its highest point and the lower port 53 at its lowest point. The bottom port 53 is connected to two or more pairs of parallel valves, in this case three pairs: 42 and 43 then 44 and 45 then 57 and 58. Valves 42, 44 and 57 serve, each one at its turn, as a solution filling valve and valves 43, 45 and 58 serve, each one at its turn, as a draining valve. The top of the cartridge container 46 may be equipped with a sensor 48 to detect when the container is full with a solution. The bottom of the cartridge container 46 may also be equipped with a sensor 49 to detect when the container becomes empty. The top port 52 is connected to a pair of parallel valves 71 and 72. Valve 71 is a vent allowing gas to escape when the container is being filled with a solution and to allow a gas to enter and fill up the cartridge container while a solution is being drained through its bottom port 53. Valve 72 may be connected to a pressurizing gas source 73 to speed up the draining of the solutions from the cartridge container. In case it is desirable to maintain a particular gaseous atmosphere around the solutions, such as for example an inert atmosphere, valve 71 will be left permanently closed while valve 72 may be connected to an inflatable balloon whose external pressure is periodically manipulated in concert with the filling and the draining of the solutions.

The cell also includes a donor feed solution feed container 38 equipped with a pump 59, a raffinate container 40 and at least one recipient feed solution feed container 39 equipped with a pump 51 plus at least one enriched recipient solution container 41. In the case depicted in FIG. 2, with two back-extraction steps, we also have a second recipient feed solution feed container 54 equipped with a pump 56 plus a second enriched recipient solution container 55. A controller 47 accepting signals from the sensors 48 and 49, or driven by a timer, controls the position of valves 42, 43, 44, 45, 57, 58, 71 and 72 such as to direct the consecutive filling and then draining of the container with the solutions each one at its turn from or to its respective container. This entire setup makes up one cell of extraction/back extraction.

The sequence of operation of the cell is as follows:

Step 1—Extraction: Starting with an empty cartridge container 46, and all valves closed, the controller 47 opens the valves 44 and 71 to let the feed donor solution into the cartridge container 46. Shortly thereafter, the cartridge container 46 becomes full and the controller 47 closes valves 44 and 71. With the donor solution, now in contact with the thin layer of extractant supported on the cartridge 50, solute is transferred from the donor solution to the extractant. The controller 47 now waits for a preset brief time and then opens valves 45 and 72 to let the raffinate solution drain into the raffinate container 40. As soon as the container 46 has emptied, the controller 47 closes valves 45 and 72.

Step 2—First back-extraction: The controller 47 now opens valves 42 and 71 to let the first recipient feed solution into the cartridge container 46. Shortly thereafter, the cartridge container 46 fills up and the controller 47 closes valves 42 and 71. With the first recipient solution, now in contact with the thin layer of extractant supported on the cartridge 50, solute is transferred from the extractant to the recipient solution. The controller 47 now waits for a preset brief time and then opens valves 43 and 72 to let the solution drain into the enriched first recipient solution container 41. When the cartridge container 46 empties, the controller shuts off valves 43 and 72.

Step 3—Second back-extraction: The controller 47 now opens valves 57 and 71 to let the second recipient feed solution into the cartridge container 46. Shortly thereafter, the cartridge container 46 fills up and the controller 47 closes valves 57 and 71. With the second recipient solution, now in contact with the thin layer of extractant supported on the cartridge 50, solute is transferred from the extractant to the second recipient solution. The controller 47 now waits for a preset brief time and then opens valves 58 and 72 to let the solution drain into the enriched second recipient solution container 55. When the cartridge container 46 empties, the controller shuts off valves 58 and 72.

When all back-extraction steps have been completed, a cycle of operation is concluded and a new cycle of operation will be started from step 1, then step 2, then step 3 and repeated for as long as there are solutions to process.

Embodiment (c)

Shell-and-tube Fixed Cartridge (See FIG. 2)

This embodiment is identical in every respect to embodiments (b) with the only exception that the cartridge container 46 and cartridge 50 are constructed in an integral shell-and-tube form. The tubes in the shell-and-tube device are made of a micro-porous material and represent the fixed cartridge 50. Either the shell or the tubes interior (lumen side) may play the role of the cartridge container 46. The other side of the tubes, that is the lumen side when the shell plays the role of cartridge container or the shell side when the tubes interior plays that role, may be left empty, or may alternatively be filled with a stagnant batch of the extractant, thereby forming a stand-by reservoir of extractant that is in constant contact with the micro-porous tubes making up the cartridge to provide continuous replenishment of the extractant on the cartridge to compensate for whatever loss of extractant may be washed away with time. The modes of operation are exactly identical to those described in embodiments (b).

Embodiment (d)

Figure 3:
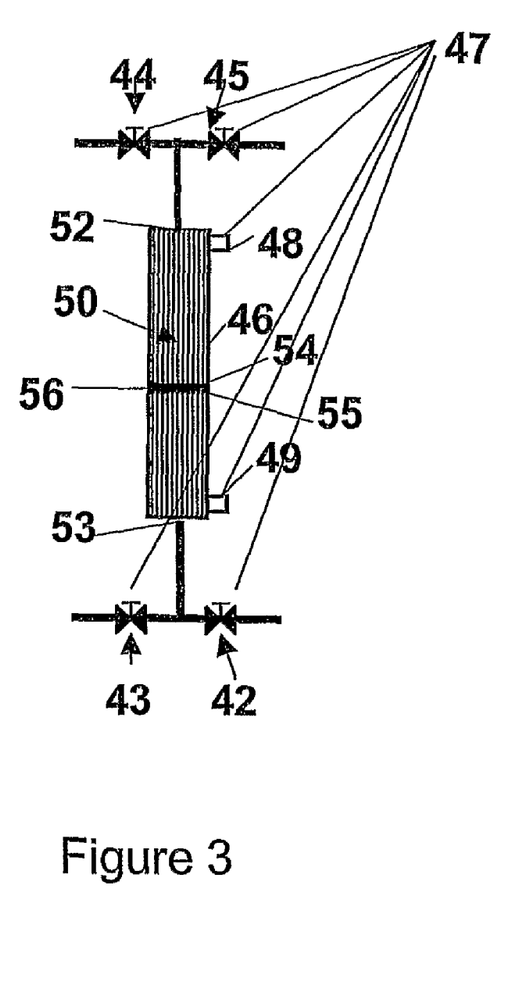
FIG. 3: Embodiment (d)—Plug-flow fixed cartridge cell

Plug-flow Fixed Cartridge Cell (See FIG. 3)

In a variation on embodiment (b), rather than using air pressure to push each solution out of the cartridge container following its contact with the supported extractant, the content of the cartridge container 46 is displaced as a plug by a new batch of a second solution whose turn it is to contact the cartridge 50. Preferably, the cartridge 50 will consist of a densely packed bundle of micro-porous capillaries and the displacement will be in a counter-current direction, meaning that a batch of the donor solution will be pumped into the cartridge container 56 at one end, displacing as a plug the recipient solution present therein and pushing it toward the exit 53 at the second end. This batch of solution is sized such that its front 54 comes close to but never reaches the second end of the cartridge. Then, an equal batch of the recipient solution is pumped into the cartridge container at the second end, displacing as a plug the donor solution that was previously introduced therein and pushing it toward the exit 52 at the first end. The front 55 of the recipient solution batch also comes close to but never reaches the first end of the cartridge 52. Then a new batch of the donor solution is pumped into the cartridge container and so on repeatedly. The volume of a batch of donor or recipient solution can be as small as desired and as large as 90-95% of the total internal volume of the micro-porous capillaries forming the cartridge.

Ideally, the virtual interface delineating the boundary between the donor and the recipient solutions will move periodically back and forth along the axis of the cartridge container whenever a new batch of solution s pumped in, without ever reaching its edges.

Practically, this interface can be expected to be somewhat diffuse due to the diffusion of solutes from one solution into the other, potentially causing some cross contamination of the solutions. However considering the capillary nature of the macro-pores in the cartridge which implies an extremely high length/width ratio, the degree of cross contamination will be limited. Using a cartridge that consists of a bundle of capillary tubes will stress the distinction between the two solutions and minimize cross contamination. When maximum prevention of cross contamination is important, mixing can be minimized and essentially eliminated by placing in between the fronts 54 and 55 of the two solutions a layer 56 of an insoluble fluid. This layer will take the form of a drop of the insoluble fluid, trapped in each of the capillaries forming the cartridge 50 in between the fronts 54 and 55 of the two solutions. The preferred insoluble fluid for this purpose is the same extractant that forms the thin layer coating the cartridge because we shall thus avoid the introduction of an additional extraneous material. It will also form a tight barrier between the two solutions by virtue of its affinity to the supported extractant layer and it may also additionally serve as an extractant reservoir that will replenish the supported extractant layer to compensate for any attrition of the supported extractant layer over time.

The insoluble barrier 56, once inserted, will separate the two solutions in a stable form as it will travel with the solutions as a piston back and forth without ever reaching the edges of the capillaries. If necessary, one can also monitor the position of the insoluble barrier 56 by means of capacitive or ultrasound sensors 48 and 49 positioned externally to the container 46, close to the two edges of the cartridge. Any possible drift in the end points of the insoluble barrier piston stroke can then be compensated by temporary fine adjustment of a solution batch.

The cartridge container 46 may be positioned such that the capillaries forming the cartridge 50 are in a vertical or horizontal, or any other desired position. The Plug-flow fixed cartridge embodiment can obviously process only one pair of solutions: one donor solution and one recipient solution. The donor solution enters and then exits the cartridge at one end 52 while the recipient solution enters and then exits at the other end 53. The donor side port 52 is connected to two parallel on-off valves 44 and 45. The recipient side port 53 is connected to two parallel on-off valves 42 and 43. Valves 44 and 42 serve, each one at its turn, the filling of the donor and recipient into the cartridge container 46. Valves 45 and 43 serve, each one at its turn, for letting out the solutions from the cartridge container 46.

The sequence of operation of the cell is as follows:

Step 0—Initialization when operating without an insoluble fluid barrier:

With the container in a position such that the capillaries are vertical, fill the cartridge container 46, including the capillaries of the cartridge 50 with a first solution up to the top of the capillaries. Fill delicately the rest of the container up to its brim with the second solution. Drain a small amount of the first solution from the bottom to retreat the virtual interface separating the two solutions a few cm into the capillaries while replenishing the container up to its brim with the second solution. Lock all ports to avoid any presence of air in the cartridge container 46 up or down to the valves 42,43,44,45. The process is now ready for operation while starting the first cycle with filling a batch of the second solution while collecting a batch of the first solution.

Alternative step 0—Initialization in the case of operation with an extractant barrier:

With the container in a position such that the capillaries are vertical, fill the cartridge container 46 with a first solution up to the top of the capillaries. Add on top of the solution a layer of the extractant. Fill delicately the rest of the container up to its brim with the second solution. Drain a small amount of the first solution from the bottom to retreat the interface a few cm into the capillaries while replenishing the container up to its brim with the second solution. Lock all ports to avoid any presence of air in the cartridge container 46 and up or down to the valves 42,43,44,45. The cell is now ready for operation while starting the first cycle with filling a batch of the second solution while collecting a batch of the first solution.

Operation sequence: At each step or half cycle, a batch of solution is pumped into the cartridge container from one end or the other depending on whether it is the donor or the recipient solution. Then it is left there briefly before proceeding the next step or half cycle.

All batches must have exactly the same volume, that must be smaller than the volume of the cartridge macro-pores.

Step 1—The extraction half cycle:

Open valves 44 and 43 and activate a pump that will feed a batch of the donor solution into port 52 at one end of the cartridge container 46, thereby displacing through port 53 at the other end of the cartridge container the batch of recipient solution previously contained therein. Now close valves 44 and 43. A brief wait time is then provided to allow transfer of the solute from the donor solution to the extractant supported on the cartridge 50.

Step 2—The back-extraction half cycle:

Open valves 42 and 45 and activate a pump that will feed a batch of the recipient solution into port 53 at the second end of the cartridge container 46, thereby displacing through port 52 at the first end of the cartridge container the batch of the recipient solution previously contained therein. Now close valves 42 and 45. A brief wait time is then provided to allow transfer of the solute from the extractant supported on the cartridge to the recipient solution.

This completes one cycle of operation. The cycles of extraction/back-extraction are now repeated indefinitely.

Embodiment (e)

Rotating Cartridge Cell. (see FIG. 4)

Figure 4:
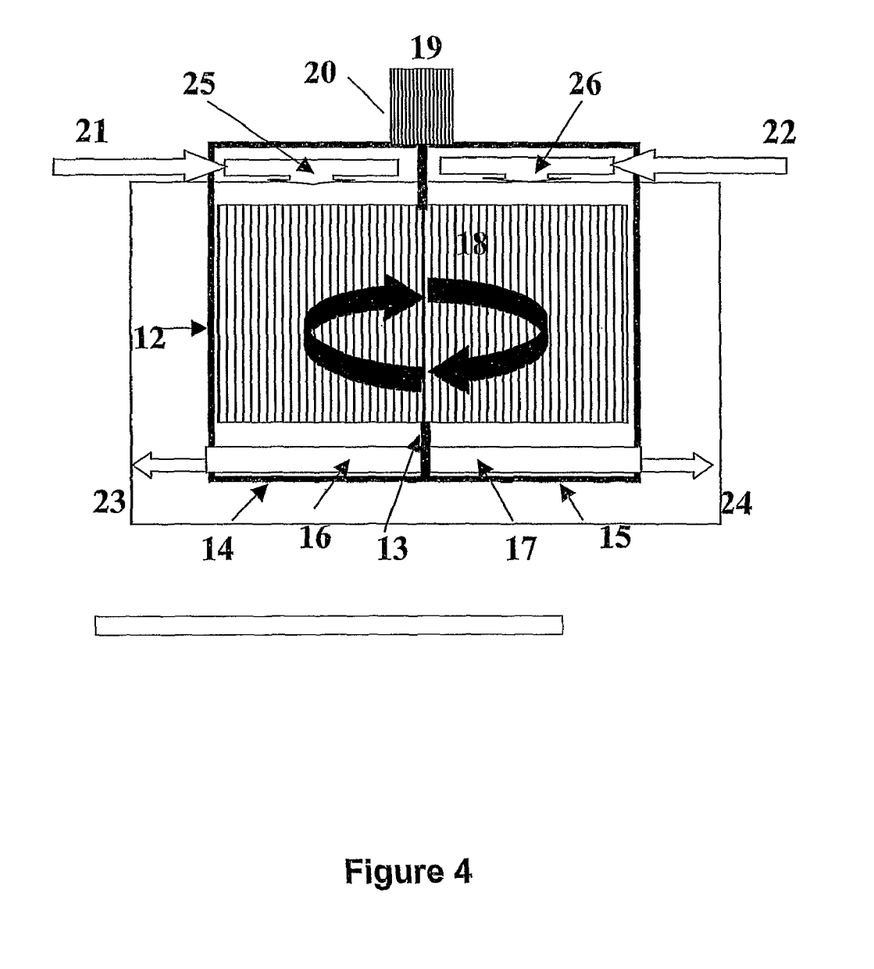
FIG. 4: Embodiment (e)—Rotating cartridge cell.

In still another embodiment, an extraction/back-extraction cell (see FIG. 4 depicting a single extraction and a single back-extraction step) consists of: (a) A vertical cylindrical container 12 whose floor is partitioned into two or more pans, here two pans 14 and 15 by means of a vertical partition 13. Pans 14 and 15 collect respectively the raffinate solution 16 and the enriched recipient solution 17. (b) A vertical cylindrical cartridge 18, permanently impregnated with the extractant and sized to fit the internal volume of the container 12, is rotated around its vertical axis by a motor 19, at discrete intervals programmed by a controller 20. (c) Spraying nozzles 25 and 26 are distributed above the cartridge to spray the donor feed solution 21 as a fine spray over the cartridge section that is located at the time of spraying exactly above the raffinate pan 14, and to spray the recipient feed solution 22 as a fine spray over the cartridge section that is located at the time of spraying exactly above the recipient solution pan 15.

The programmed rotation cycle includes: (a) rotation into position, bringing the sections of the cartridge to be exactly above their new respective pans. (b) Simultaneously spraying the cartridge sections with the donor and recipient solutions while each section is located exactly above its respective pan. Spraying will last typically for a few seconds. (c) Brief waiting. (d) Shaking the cartridge gently for a programmed brief time, to shake off any clinging solution. (e) Rotation into next position, then repeating (b), (c) and (d). A full cycle of rotation corresponds to a full extraction/back-extraction cycle. (f) Repeating the cycle indefinitely.

The cartridge being rotated periodically a section at a time causes each cartridge section to be alternately exposed to the donor and recipient solutions, each one at its turn. The raffinate solution 16 and the enriched recipient solution 17 accumulating in their respective pans may be continuously withdrawn from their respective pans at the bottom of the cell as streams 23 and 24.

For a closed extraction cycle involving one extraction step followed by more than one back extraction step (for example if a washing step needs to be incorporated in the extraction cycle), the circular pan on the floor of container 12, collecting the product solutions will be subdivided symmetrically into three or more sections corresponding to the number of steps in the process. Also, there will be above the cartridge a number of sets of spraying nozzles equal to the number of steps in the process and those will be aligned with their respective pan on the floor.

Embodiment (f)

Figure 5:
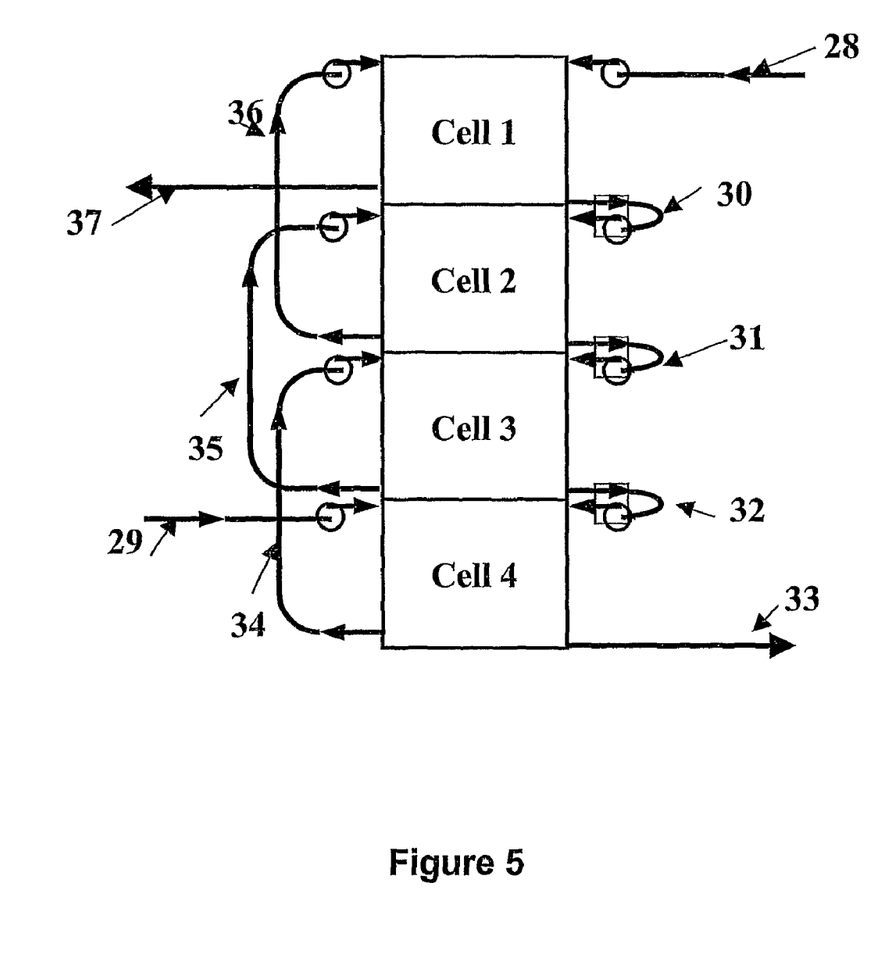
FIG. 5: Embodiment (f)—A train of counter-current rotating or of one-sided fixed cartridge cells.

A Train of Counter-current Rotating or of One-sided Fixed Cartridge Cells (see FIG. 5)

Any number of rotating or of one-sided fixed cartridge cells may be stacked or otherwise connected in series to form a horizontal train or a vertical column as depicted in FIG. 5.

Gravity transfer of a solution from cell to cell may be applied to at most one of the solutions indicating the necessity to use pumps for the transfer of at least one of the solutions from cell to cell. While any flow configuration from cell to cell is feasible, the counter-current configuration depicted in FIG. 5 for a four-stage train of cells arranged as a column is of special interest.

It is equally feasible to have the donor solution flow downward and the recipient solution flow upward or the other way around. In FIG. 5, the process donor feed solution 28 is fed to cell 1 and the process recipient feed solution 29 is fed to cell 4. The partially raffinated solution 30 exiting cell 1 is the donor feed solution to cell 2; the partially raffinated solution 31 exiting cell 2 is the donor feed solution to cell 3; the partially raffinated solution 32 exiting cell 3 is the donor feed solution to cell 4 and the raffinated donor solution 33 exits cell 4 as the process raffinate product. The partially enriched recipient solution 34 exiting cell 4 is the recipient feed solution to cell 3, the partially enriched recipient solution 35 exiting cell 3 is the recipient feed solution to cell 2, the partially enriched recipient solution 36 exiting cell 2 is the recipient feed solution to cell 1 and the enriched recipient solution 37 exits cell 1 as the process enriched recipient product.

Embodiment (g)

Figure 6:
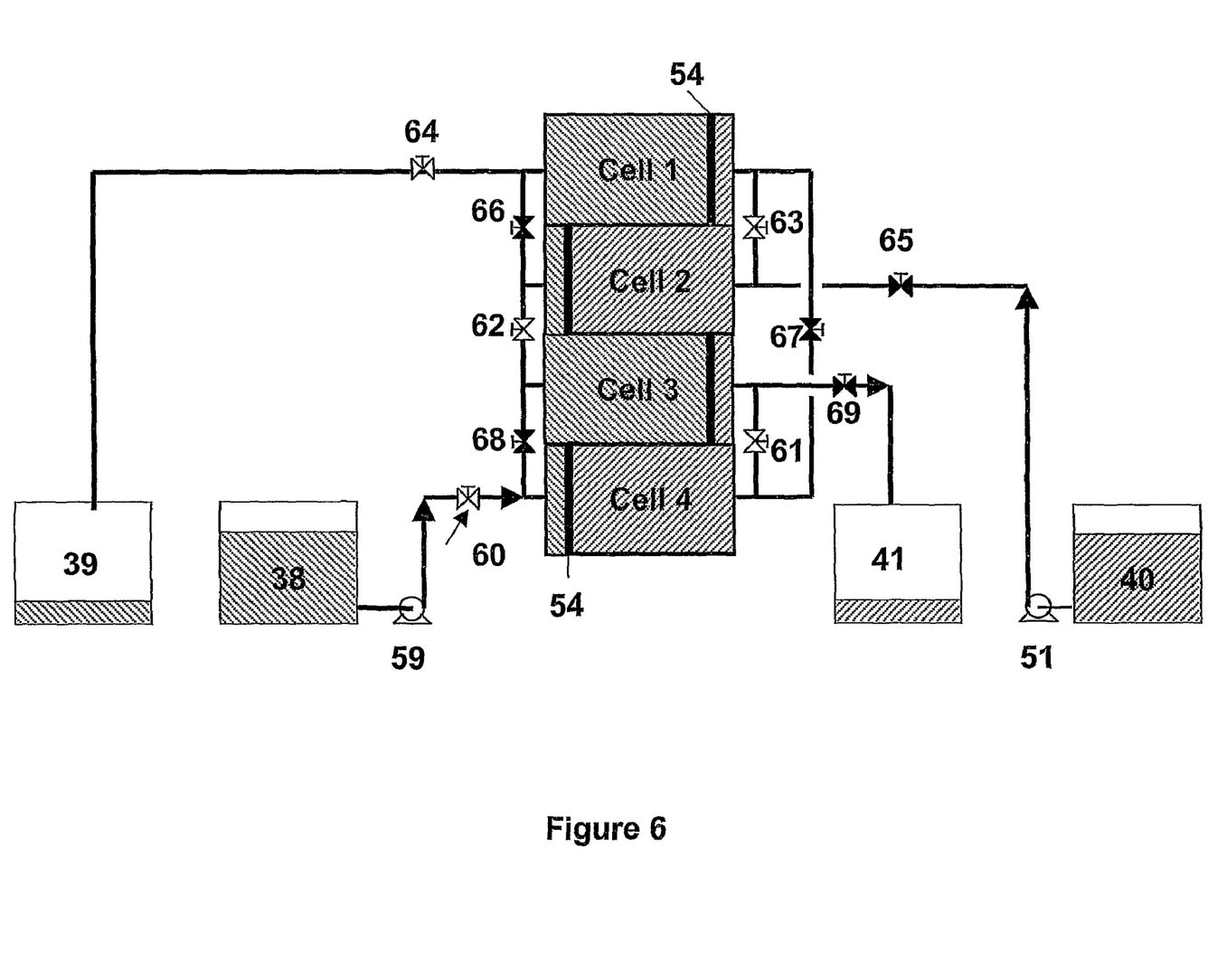
FIG. 6: Embodiment (g)—A train of counter-current plug-flow fixed cartridge cell

A Train of Counter-current Plug-flow Fixed Cartridge Cell (See FIG. 6)

Plug-flow fixed cartridge cells as described in embodiment (d) may also be stacked as a train or column with each cell in either a horizontal or vertical position. Such a train or column will consist of an even number of cells or stages (in FIG. 6 there are four such cells), all identical in size and construction. At any moment, half of the cells will be extracting (state E), while the other half will be back-extracting (state B). Each solution enters and exits each cell from a same port, one port for the donor solution and another for the recipient solution. Initially, half of the cells are filled to the conditions prevailing at the end of the extraction half cycle (state E) that is they are almost full with the donor solution and the other half of the cells are filled to the conditions prevailing at the end of the back-extraction half cycle (state B) that is they are full to the same degree with the recipient solution. The cells are ordered in an alternating order: E, B, E, B, etc. In FIG. 6, cell 1 and cell 3 are initially at the condition prevailing at the end of the extraction stroke (state E), while cell 2 and cell 4 are initially at the condition prevailing at the end of the back-extraction stroke (state B). Initially, all valves are closed and the pumps are idle.

Operation sequence: At each step or half cycle, a batch of solution is pumped into the last stage or the second stage of the column depending on whether it is the donor or the recipient solution. Following a brief wait, a batch of the second solution is pumped into the other end of the column. All batches are of exactly the same volume, equal to slightly less than the volume of the macro-pores of the cartridge in a single stage.

Step 1. Donor pumping and collection stroke:

Valves 60, 61, 62, 63, 64 are opened and a batch of donor solution is pumped from the donor feed tank 38 by means of pump 59 into cell 4 thereby displacing as a plug the recipient solution contained in cell 4 through valve 61 into cell 3, thereby displacing the donor solution contained in cell 3 through valve 62 into cell 2, thereby displacing as a plug the recipient solution contained in cell 2 through valve 63 into cell 1, thereby displacing the donor solution contained in cell 1 through valve 64 into the raffinate product tank 39. Now close valves 60, 61, 62, 63, 64. At this point, a brief waiting time is provided to allow the transfer of solute from the donor solution to the extractant in the stages in state E and the transfer of solute from the extractant to the recipient solution in the stages in state B. One stroke produces one batch of raffinate out of one batch of donor feed solution having passed through all four stages.

Step 2. Recipient pumping and collection stroke:

Valves 65, 66, 67, 68, 69 are now opened and a batch of recipient solution is pumped from the recipient feed tank 40 by means of pump 51 into cell 2 thereby displacing as a plug the donor solution contained in cell 2 through valve 66 into cell 1 thereby displacing the recipient solution contained in cell 1 through valve 67 into cell 4, thereby displacing as a plug the donor solution contained in cell 4 through valve 68 into cell 3, thereby displacing the recipient solution contained in cell 3 through valve 69 into the wash product tank 41.

Valves 65, 66, 67, 68, 69 are now closed. At this point, a brief waiting time is provided to allow for the transfer of solute from the donor solution to the extractant in the stages in state E and the transfer of solute from the extractant to the recipient solution in the stages in state B. One stroke produces one batch of wash product out of one batch of recipient feed solution having passed through all four stages.

Two strokes, one pumping donor solution and the next pumping recipient solution form one full cycle of operation, processing one batch of each of the donor and recipient solutions. Cycles of operation are repeated as long as there are solutions to process. The train of counter-current plug-flow fixed cartridge cells has important advantages:

(i) It is compact and it utilizes space and time fully, thereby providing the highest throughput per unit equipment volume of all embodiments.
(ii) Stages chaining in a multistage train or column is most direct, with no reservoirs or pumps in between the stages, thereby simplifying and streamlining the multistage plant considerably.

The train of counter-current plug-flow fixed cartridge cells can only process one donor and one recipient solution at a time.

Our invention reduces or dissipates important difficulties associated with current Liquid-Liquid Extraction methods in the realms of safety, environment protection, operability and cost of operation:

a) Our invention reduces very significantly the amount of extractant and solvents used in the extraction process and the necessary inventory of extractants and solvents kept in a plant. This has important implications on costs, because the extractants used in extraction are costly and it also opens an opportunity to use more potent but expensive extractants. Another important implication concerns the safety and the environmental impact of the operation because the solvents used are typically volatile, flammable and potentially toxic.

b) Our invention provides a larger flexibility in the choice of an extractant by turning the density, viscosity, interfacial tension and the tendency to sometimes create a third phase with the extractant into irrelevant factors. Also, with cost and ease of separation removed from being considerations in the selection of an extractant for a particular extraction task, our invention permits the use of a pure undiluted extractant which is generally more potent.

c) Our invention improves the operability in the extraction plant by eliminating the phase separation consideration, which poses major design and control limitations in present extraction technology. The utilization of external mechanical force rather than a reliance on fluid properties to control the encounter of the phases and their separation bestows the process with an improved accuracy of control.

d) Our invention combines extraction and back-extraction into an integrated piece of equipment, thereby potentially reducing the size of the plant, its footprint and cost.

e) Our invention permits distinct physical separation of the extractant supporting moving part (the cartridge) from the solutions containers, thus facilitating cleaning of the latter. This opens the road to the application of our invention in multi-product plants where several interchangeable product-specific cartridges will serve the production of respective products using a common plant envelope and driving mechanism.

f) An extraction plant according to our invention can be scaled up or down to any dimension and capacity most directly through a rule of proportionality to the cross section area of the cartridge, free of the difficulty usually experienced in the scaling up of other methods of extraction.

EXAMPLE 1

Single cell rotating cartridge: A cell consisting of a Ø 13×10 cm cylindrical cartridge rotating inside a cylindrical Ø14 cm shell, with two pumps each feeding a set of fine spray nozzles at fixed positions above the cartridge, each set covering exactly half the cartridge area and aligned exactly with the two half pan receivers at the bottom of the cell. The cartridge itself was constructed of a cylindrical frame of metal wire across which a double layer, long strip of Celgard 2500 flat sheet micro-porous membrane, was stretched radially in a winding tortuous path creating vertical channels separated by walls of Celgard membrane, 2-8 mm apart. The membrane was of 25μ thickness, had a porosity of 0.55, and had a total wetted surface of 2100 cm2. The cartridge was impregnated, with the extractant Alamine 336. It was then washed with water at 25 degrees C., until all excess extractant was removed, as evidenced by no further contamination of the wash water with the extractant. At this point it was determined that the membrane contained 4.6 gr of the extractant. The donor solution feed, a 1% wt citric acid solution in water, and the recipient feed solution consisting of pure water, both at a temperature of 25 degree C., were pumped simultaneously each into its set of nozzles in 2.3 seconds bursts at 23 gr a burst. This is equivalent to an average feed rate of 0.6 liter/min for each of the donor and the recipient solutions. The controller was programmed to cause a repeated cycle of (a) Bringing the cartridge into position by an exact 180 degree rotation of the cartridge, (b) Simultaneous 2.3 seconds spraying of the two feed solutions each on the section of the cartridge present at the time below it. (c) Waiting for 2 seconds. (d) Vertical shaking of the cartridge for 2 seconds. The compositions of the streams withdrawn from the bottom of the cell, as measured by means of conductivity cells, indicated values of 0.6% wt. for the enriched recipient solution and 0.4% wt. for the raffinate.

EXAMPLE 2

Single cell rotating cartridge—Temperature driven extraction: A cell consisting of a Ø13×10 cm cylindrical cartridge rotating inside a cylindrical Ø14 cm shell, with two pumps each feeding a set of fine spray nozzles at fixed positions above the cartridge, each set covering exactly half the cartridge area and aligned exactly with the two half pan receivers at the bottom of the cell. The cartridge itself was constructed of a cylindrical frame of wire across which a double layer, long strip of Celgard 2500 flat sheet micro-porous membrane, was stretched in a radial winding tortuous path creating vertical channels separated by walls of Celgard membrane 2-8 mm apart. The membrane was of 25μ thickness, had a porosity of 0.55, and total wetted surface of 2100 cm2. It was impregnated, while still dry, with the extractant Alamine 336. It was then washed with water at 50 degree C. until all excess extractant was removed, as evidenced by no further contamination of the wash water with the extractant. At this point it was determined that the membrane contained 4.0 gr of the extractant. The donor feed solution, a 1% wt citric acid solution at 10 degree C. in water and the recipient feed solution, consisting of a 1% wt citric acid solution at 50 degree C in water were pumped each in its respective set of nozzles in 2.3 seconds bursts at 23 gr a burst. This is equivalent to an average feed rate of 0.6 liter/min. The controller was programmed to cause a repeated cycle of (a) Bringing the cartridge into position by an exact 180 degree rotation of the cartridge, (b) Simultaneous spraying of the two feed solutions each on its respective section totaling 23 gr of solution in each over a 2.3 second spray burst. (c) Waiting for 2 seconds, (d) vertical shaking of the cartridge for 2 seconds.

The compositions of the streams withdrawn from the bottom of the cell, as measured by means of conductivity cells, indicated values of 0.45% wt. for the raffinate and 1.55% wt. for the enriched recipient solution.

EXAMPLE 3

Single cell—Fixed Cartridge embodiment: A single cell constructed in the form of embodiment (b) used a cylindrical vertical container having one port at its top and one port at its bottom. The container dimensions were 3 cm internal diameter and 25 cm height. A cartridge was formed by bundling 690 hollow fibers of micro-porous polypropylene, each having an external diameter of 0.1 cm, a wall thickness of 0.02 cm and 21.5 cm in length. This bundle formed a cartridge having a macro-porosity of 0.67, a micro-porosity of 0.4 and an active surface of approximately 0.68 m2. The cartridge was impregnated with an Alamine 336 extractant taking up approximately 10 gr Alamine. The cartridge was then washed with cold water until all excess extractant was removed, as evidenced by no further contamination of the wash water with the extractant. At this point it was determined that the cartridge contained 5.5 gr of the extractant. The cartridge was introduced into the container which was then filled through the bottom port with 92 cm3 of the donor feed solution consisting of a 1% wt. citric acid solution in water at 25 degrees C. Filling time was 3 seconds. The donor solution was kept in the container for 5 seconds. The solution was then drained through the bottom port and collected as a raffinate. Draining was aided by imposing a 0.2 kg/cm2 air pressure at the top port and took 3 seconds. Next, the container was filled again through the bottom port with the recipient feed solution consisting 92 cm3 of pure water at 25 degrees C. Filling time was 3 seconds. The recipient solution was kept in the container for 5 second. The solution was then drained through the bottom port and collected as an enriched recipient solution product. Draining was aided by imposing a 0.2 kg/cm2 air pressure at the top port and took 3 seconds. Having completed an extraction/back-extraction cycle, the same procedure was repeated 20 times. The composition of the enriched recipient solution was measured by means of a conductivity cell, and found to be 0.3% wt. The composition of the raffinate was measured by means of a conductivity cell, and found to be 0.7% wt.

The invention claimed is:

1. A Liquid-Liquid Extraction method for extracting at least one species from a donor liquid solution into at least one recipient liquid, the method comprising:
providing a layer of liquid extractant supported as a liquid, by capillary forces on a solid substrate comprising an open macro-porous solid matrix made of a micro-porous material having affinity to the extractant liquid, the solid matrix having open channels wide enough to permit free flow of the solution into and out of the channels;
alternately, separately and repeatedly bringing the donor liquid solution and the recipient liquid in brief contact for a few seconds with the liquid extractant supported on the solid substrate so as to transfer said at least one species from the donor liquid solution onto the layer of extractant and then from the layer of the extractant into the recipient liquid.

2. The method as claimed in claim 1, wherein the step of alternately, separately and repeatedly, bringing the donor liquid solution and the recipient liquid in contact with the liquid extractant supported on the solid substrate comprises alternately and periodically dipping the solid substrate with the supported liquid extractant into the donor liquid solution and then into the recipient liquid.

3. The method as claimed in claim 1, wherein the step of alternately, separately and repeatedly, bringing the donor liquid solution and the recipient liquid in contact with the liquid extractant supported on the solid substrate comprises:
providing a container for containing the solid substrate with the supported liquid extractant;
letting the donor liquid solution into the container;
draining the donor liquid solution from the container;
letting the recipient liquid into the container; and
draining the recipient liquid from the container.

4. The method as claimed in claim 3, wherein the draining of the donor liquid solution and the recipient liquid from the container is done using pressurized gas.

5. The method as claimed in claim 3, wherein the step of alternately, separately and repeatedly, bringing the donor liquid solution and the recipient liquid in contact with the liquid extractant supported on the solid substrate comprises pumping the donor liquid solution into the container at one end of the container, displacing the recipient liquid occupying the container and then pumping the recipient liquid into the container at another end of the container, displacing the donor liquid solution.

6. The method as claimed in claim 1, wherein the step of alternately, separately and repeatedly, bringing the donor liquid solution and the recipient liquid in contact with the liquid extractant supported on the solid substrate comprises:
alternately spraying the donor liquid solution and the recipient liquid onto the solid substrate with supported layer of extractant.

7. The method as claimed in claim 6, comprising:
providing two spraying nozzles, a first spraying nozzle for spraying the donor liquid solution over a first section of the solid substrate and a second spraying nozzle for spraying the recipient liquid over a second section of the solid substrate; and
moving the solid substrate so that the first and second section exchange positions.

8. The method as claimed in claim 7, wherein the step of moving the solid substrate so that the first and second section exchange positions comprises rotating the solid substrate.

9. The method as claimed in claim 7, wherein the spraying the donor liquid solution and the recipient liquid onto the liquid extractant supported on the solid substrate is done simultaneously.

10. A Liquid-Liquid Extraction apparatus for extracting at least one species from a donor liquid solution into at least one recipient liquid, the apparatus comprising at least one cell that includes a layer of liquid extractant supported as a liquid, by capillary forces on a solid substrate comprising an open macro-porous solid matrix made of a micro-porous material having affinity to the extractant liquid, the solid matrix having open channels wide enough to permit free flow of the solution into and out of the channels, and at least one port for alternately, separately and repeatedly introducing the donor liquid solution and the recipient liquid.

11. The apparatus of claim 10, wherein the cell is housed in a container.

12. The apparatus of claim 10, wherein said at least one port includes one port that serves for draining the donor liquid solution and the recipient liquid.

13. The apparatus of claim 10, wherein said at least one cell comprises a plurality of cells fluidically connected in series.

14. The apparatus of claim 10, wherein said at least one cell comprises a plurality of cells that are stacked in the form of a column.

15. The apparatus of claim 10, wherein said at least one cell is rotatable.

* * * * *